United States Patent [19]

Wagensommer et al.

[11] Patent Number: 4,532,302

[45] Date of Patent: Jul. 30, 1985

[54] PROCESS FOR THE SULFONATION OF AN ELASTOMERIC POLYMER

[75] Inventors: Joseph Wagensommer, Westfield; Robert R. Klein, Berkeley Heights; Robert D. Lundberg, Bridgewater, all of N.J.

[73] Assignee: Exxon Research and Engineering Co., Florham Park, N.J.

[21] Appl. No.: 627,080

[22] Filed: Jul. 2, 1984

Related U.S. Application Data

[63] Continuation-in-part of Ser. No. 383,724, Jun. 1, 1982, abandoned.

[51] Int. Cl.$^3$ .................................................. C08F 8/36
[52] U.S. Cl. .............................. 525/343; 525/331.8; 525/332.9; 525/333.1; 525/344
[58] Field of Search .................................. 525/343, 344

[56] References Cited

U.S. PATENT DOCUMENTS

| | | | |
|---|---|---|---|
| 2,877,213 | 3/1959 | Eichhorn | 525/344 |
| 3,836,511 | 9/1974 | O'Farrell et al. | 525/344 |
| 4,077,933 | 3/1978 | Burton et al. | 525/343 |
| 4,119,616 | 10/1978 | O'Farrell et al. | 525/344 |
| 4,321,340 | 3/1982 | Klein et al. | 525/344 |

*Primary Examiner*—Bernard Lipman
*Attorney, Agent, or Firm*—Richard E. Nanfeldt

[57] ABSTRACT

A continuous process for sulfonating elastomeric polymers to form neutralized sulfonated elastomeric polymers with improved physical properties includes the steps of; (a) contacting a cement of an elastomeric polymer with a sulfonating agent in a staged reaction vessel for a sufficient period of time at a temperature of about −50° C. to about +100° C. to form an unneutralized sulfonated elastomeric polymer; (b) continuously transferring the cement of the unneutralized sulfonated elastomeric polymer to a neutralization vessel; (c) continuously adding a quenching agent and neutralizing agent to the cement of the unneutralized sulfonated elastomeric polymer in a staged neutralization vessel wherein the sulfonated cement is quenched and the neutralization agent reacts with the unneutralized sulfonated polymer to form the neutralized sulfonated elastomeric polymer; and (d) isolating said neutralized sulfonated elastomeric polymer.

16 Claims, No Drawings

PROCESS FOR THE SULFONATION OF AN ELASTOMERIC POLYMER

CROSS-REFERENCE TO RELATED APPLICATIONS

This application is a continuation-in-part of U.S. Ser. No. 383,724 filed June 1, 1982 now abandoned.

FIELD OF THE INVENTION

A continuous process for sulfonating elastomeric polymers to form neutralized sulfonated elastomeric polymers with improved physical properties includes the steps of; (a) contacting a cement of an elastomeric polymer with a sulfonating agent in a staged reaction vessel for a sufficient period of time at a temperature of about −50° C. to about +100° C. to form an unneutralized sulfonated elastomeric polymer; (b) continuously transferring the cement of the unneutralized sulfonated elastomeric polymer to a neutralization vessel; (c) continuously adding a quenching agent and neutralizing agent to the cement of the unneutralized sulfonated elastomeric polymer in a staged neutralization vessel wherein the sulfonated cement is quenched and the neutralization agent reacts with the unneutralized sulfonated polymer to form the neutralized sulfonated elastomeric polymer; and (d) isolating said neutralized sulfonated elastomeric polymer.

BACKGROUND OF THE INVENTION

A class of thermoelastic sulfonated polymer has been described in a number of U.S. patents, wherein these sulfonated elastomeric polymer have been produced from commercial elastomeric polymers by either sulfonating with a sulfur trioxide complexed with Lewis base or an acetyl sulfate.

These previous patents teach a batch method of sulfonation which comprises reacting the elastomeric polymer with the sulfonating agent in a reaction vessel to form an unneutralized sulfonated polymer and then adding a neutralizing agent to the reaction vessel to neutralize the unneutralized sulfonate polymer.

U.S. Pat. No. 3,642,728, herein incorporated by reference, clearly teaches a method of selective sulfonation of olefinic unsaturation sites of an elastomeric polymer such as Vistalon 3509 having a Mooney viscosity of 90 at 100° C. to form an acid form of a sulfonated elastomeric polymer. The olefinic sites of the elastomeric polymer are sulfonated by means of a sulfur trioxide complexed with a Lewis base. The SO₃H groups of the sulfonated elastomer are directly neutralized in the reaction vessel with a basic material to form an ionically cross-linked elastomer having substantially improved physical properties over an unsulfonated elastomer at room temperature.

U.S. Pat. Nos. 3,836,511 and 4,184,988, herein incorporated by reference, teach a batch process for the sulfonation of the olefinic sites of the elastomeric polymer, wherein the sulfonating agent is selected from acetyl sulfate, propionyl sulfate and butyryl sulfate. The neutralizing agents employed to neutralize the unneutralized form of the sulfonated elastomeric polymers are organic amines or inorganic bases.

Again the neutralizing agent is added directly to the reaction vessel containing the unneutralized sulfonated polymer to form the neutralized sulfonated polymer.

The continuous process for sulfonation of elastomeric polymers as described in this invention provides a means for employing stoichiometric amounts of sulfonation and neutralization agents thereby permitting reduction in co-solvent requirements to less than 4 vol. % and to maintain neutralized cement viscosities below 25,000 c.P. at 20 wt.% polymer solid concentration level.

The instant process can be generally described as an improved, in-line continuous process for the sulfonation and subsequent neutralization of elastomeric polymers. The dissolved polymer cement is continuously contacted in a well-stirred, staged reactor with a sulfonating agent which can be preformed and continuously fed in the reactor or formed, in situ, in the reactor. Stoichiometric sulfonation is achieved in residence times of about 1 to about 20 minutes; more preferably less than about 10 minutes. The sulfonated cement is continuously terminated and neutralized in a separate, staged neutralization vessel at residence times of about 1 to about 20 minutes. The sulfonated and neutralized cement is then steam stripped and the neutralized sulfonated elastomeric polymer is isolated as a crumb or powder which can be dried and finished in a hot-air dryer.

SUMMARY OF THE INVENTION

A continuous process for sulfonating elastomeric polymers to form neutralized sulfonated elastomeric polymers with improved physical properties includes the steps of (a) contacting a cement of an elastomeric polymer with a sulfonating agent in a staged reaction vessel for a sufficient period of time at a temperature of about −50° C. to about +100° C. to form an unneutralized sulfonated elastomeric polymer; (b) continuously transferring the cement of the unneutralized sulfonated elastomeric polymer to a neutralization vessel; (c) continuously adding a quenching agent and neutralizing agent to the cement of the unneutralized sulfonated elastomeric polymer in a staged neutralization vessel wherein the sulfonated cement is quenched and the neutralization agent reacts with the unneutralized sulfonated polymer to form the neutralized sulfonated elastomeric polymer; and (d) isolating said neutralized sulfonated elastomeric polymer.

It is an object of our present invention to provide an improved continuous process for the sulfonation of elastomeric polymers to form neutralized, sulfonated elastomeric polymers which have improved heat-aging and physical properties.

The present invention relates to a continuous process for sulfonating an elastomeric polymer which comprises the steps of; forming a cement of said elastomeric polymer by dissolving said elastomeric polymer in a non-reactive solvent selected from the group consisting of chlorinated aliphatic hydrocarbon, a chlorinated aromatic hydrocarbon, an aromatic hydrocarbon and an aliphatic hydrocarbon, said elastomeric polymer being selected from the group consisting of a butyl rubber, a styrene-butadiene copolymer, an isoprene-styrene copolymer and an EPDM terpolymer; continuously contacting a sulfonating agent with said cement for about 2 to about 9 minutes at about −50° C. to +100° C. to form an unneutralized sulfonated elastomeric polymer; continuously transferring said cement of said unneutralized sulfonated elastomeric polymer to a staged, neutralization vessel; continuously quenching said sulfonation reaction with an aliphatic alcohol, a cycloaliphatic alcohol, water or an aromatic hydroxyl compound in said staged, neutralized vessel; and continuously neutralizing in said staged neutralization vessel said unneutralized sulfonated polymer to form a neutralized sulfonated elastomeric polymer.

DETAILED DESCRIPTION OF THE INVENTION

The present invention relates to a continuous, in-line process for the sulfonation of elastomeric polymers to form neutralized sulfonated elastomeric polymers which exhibit improved heat-aging and physical properties as compared to sulfonated polymers formed by a batch process. The continuous, in-line process comprises the steps of; (a) forming a cement of an elastomeric polymer in a well-stirred, staged reaction vessel; (b) contacting the cement of the elastomeric polymer with a sulfonating agent at a temperature of about $-50°$ C. to about $+100°$ C. for about 1 to about 20 minutes, more preferably less than 10 minutes, in a well-stirred, staged reactor vessel, thereby sulfonating the elastomeric polymers to form an unneutralized sulfonated elastomeric polymer, wherein the sulfonating agent can be preformed and added continuously into the staged reactor vessel or the sulfonating agent can be formed, in situ, in the cement of the elastomeric polymer; (c) continuously transferring the cement of the unneutralized sulfonating elastomeric polymer to the staged, neutralization vessel; (d) continuously injecting a quenching agent into the cement of the unneutralized sulfonated elastomeric polymer in the staged neutralization vessel in order to quench the cement of unneutralized sulfonated elastomeric polymer; (e) continuously injecting a neutralizing agent into the cement of the unneutralized sulfonated elastomeric polymer in the staged, neutralization vessel in order to neutralize the unneutralized sulfonated elastomeric polymer thereby forming a neutralized sulfonated elastomeric polymer; (f) steam stripping the quenched cement of the neutralized sulfonated elastomeric polymer to isolate a powder or crumb of the neutralized sulfonated elastomeric polymer; and (g) drying the crumb or powder of the neutralized sulfonated elastomer with hot air.

The neutralized sulfonated elastomeric polymer of the instant invention are derived from unsaturated polymers which include low unsaturated elastomeric polymers such as Butyl rubber, or EPDM terpolymers.

Alternatively, other unsaturated polymers are selected from the group consisting essentially of partially hydrogenated polyisoprenes, partially hydrogenated polybutadienes, neoprene, styrene-butadiene copolymers of isoprene-styrene random copolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g., isobutylene and about 0.5 to about 30% by weight of a conjugated multiolefin having from about 4 to 14 carbon atoms, e.g., isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000, especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably 1 to about 4% e.g., 2%.

Illustrative of such a Butyl rubber is Exxon Butyl 365 (Exxon Chemical Co.), having a mole percent unsaturation of about 2.0% and a Mooney viscosity (ML, 1+3, 212° F.) of about 40 to 50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt.% olefinic unsaturation, more preferably about 2 to about 8, most preferably about 3 to 7, defined according to the definition as found in ASTM-D1418-64, and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt.% ethylene and about 1 to about 10 wt.% of a diene monomer, the balance of the polymer being propylene. Preferably, the polymer contains about 50 to about 70 wt.% ethylene, e.g., 5.0 wt.%. The diene monomer is preferably a non-conjugated diene.

Illustrative of these non-conjugated diene monomers which may be used in the terpolymer (EPDM) are: 1,4-hexadiene, dicyclopentadiene, 5-ethylidene-2-norbornene, 5-methylene-2-norbornene, 5-phenyl-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt.% and a 5-ethylidene-2-norbornene content of about 5.0 wt.%. The $M_n$ of Vistalon 2504 is about 47,000, the $M_v$ is about 145,000 and the $M_w$ is about 174,000.

Another EPDM terpolymer Vistalon 2504-20 is derived from V-2504 (Exxon Chemical Co.) by a controlled extrusion process, wherein the resultant Mooney viscosity at 212° F. is about 20. The $M_n$ of Vistalon 2504-20 is about 26,000, the $M_v$ is about 90,000 and the $M_w$ is about 126,000.

Nordel 1320 (DuPont) is another terpolymer having a Mooney viscosity at 202° F. of about 25 and having about 53 wt.% of ethylene, about 3.5 wt.% of 1,4-hexadiene, and about 43.5 wt.% of propylene.

The EPDM terpolymers of this invention have a number average molecular weight ($M_n$) of about 10,00 to about 200,00, more preferably of about 15,000 to about 100,000, and most preferably of about 20,000 to about 60,000. The Mooney viscosity (ML, 1+8, 212° F.) of the EPDM terpolymer is about 5 to about 60, more preferably 10 to about 50, most preferably about 15 to about 40. The $M_v$ of the EPDM terpolymer is preferably below about 350,000 and more preferably below about 300,00. The $M_w$ of the EPDM terpolymer is preferably below about 500,000 and more preferably below about 350,000.

In carrying out the invention, in the staged reaction vessel, the elastomeric polymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane, or heptane. The preferred solvents are the lower boiling aliphatic hydrocarbons. A sulfonating agent is either formed, in situ, in the cement or is continuously added to the cement of the elastomeric polymer and non-reactive solvent at a temperature of about $-50°$ C. to about $+100°$ C. for a period of time of about 1 to about 20 minutes, most preferably at room temperature for about 1 to about 10 minutes; and most preferably about 2 to about 7. Typical sulfonating agents are described in U.S. Pat. No. 3,836,511, previously incorporated herein by reference. These sulfonating agents are selected from an acyl sulfate, a mixture of sulfuric acid and an acid anhydride. The most preferred sulfonation agent for this invention is an acyl sulfate selected from the group consisting essentially of benzoyl, acetyl, propionyl or butyryl sulfate. The acyl sulfate can be formed, in situ, in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The unneutralized sulfonated elastomeric polymer has about 10 to about 100 meq. $SO_3H$ groups per 100 grams of sulfonated polymer, more preferably about 15 to about 50, and most preferably about 20 to about 40. The meq. of $SO_3$ per 100 grams of polymer is determined by both titration of the polymeric sulfonic acid and Dietert Sulfur analysis. In the titration of the sulfonic acid, the polymer is dissolved in solvent consisting of 95 parts of toluene and 5 parts of methanol at a concentration level of 50 grams per liter of solvent. The acid form is titrated with ethanolic sodium hydroxide to an Alizarin Thymolphthalein endpoint.

The unneutralized sulfonated polymer is gel-free and hydrolytically stable. Gel is measured by stirring a given weight of polymer in a solvent comprised of 95 toluene/5 methanol at a concentration of 5 wt.% for 24 hours, allowing the mixture to settle, withdrawing a weighed sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

The reaction is quenched in the staged neutralization vessel with an aliphatic alcohol such as methanol, ethanol, isopropanol, with an aromatic hydroxyl compound, such as phenol, a cycloaliphatic alcohol such as a cyclohexanol or with water.

Neutralization of the unneutralized sulfonated elastomeric polymer is done in the staged neutralization vessel by the continuous addition of a solution of a basic salt to the unneutralized sulfonated elastomeric polymer dissolved in the mixture of the aliphatic alcohol and non-reactive solvent. The basic salt is dissolved in a binary solvent system consisting of water and/or an aliphatic alcohol. The counterion of the basic salt is selected from antimony, aluminum, lead or Groups IA, IIA, IB or IIB of the Periodic Table of Elements and mixtures thereof. The anion of the basic salt is selected from a carboxylic acid having from about 1 to 4 carbon atoms, a hydroxide or alkoxide and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferable to neutralize at least 95% of the acid groups, more preferably about 98%, most preferably 100%.

Examples of metal oxides useful in preparing metal sulfonates are MgO, CaO, BaO, ZnO, $Ag_2O$, $PbO_2$ and $Pb_3O_4$. Useful examples of metal hydroxides are NaOH, KOH, LiOH, $Mg(OH)_2$ and $Ba(OH)_2$. The resultant neutralized sulfonated terpolymer has a viscosity at 0.73 $sec^{-1}$ at 200° C. of about $1\times10^5$ poises to about $50\times10^6$ poises, more preferably of about $3\times10^5$ poises to about $3\times10^6$ poises and most preferably about $5\times10^5$ poises to about $3.0\times10^6$ poises.

The neutralized, sulfonated elastomeric polymer can be isolated in a powder or crumb from the cement of the neutralized, sulfonated elastomeric polymer by conventional steam stripping means.

The powder or crumb of the neutralized, sulfonated polymer is finished and dried by means of hot air.

DETAILED DESCRIPTION OF THE PREFERRED EMBODIMENTS

The advantages of the instant continuous sulfonation process of the instant invention may be more readily appreciated by reference to the following examples.

EXAMPLE 1

A continuous sulfonation-neutralization run using a 17 Mooney (ML, 1+8, 212° F.) EPDM containing about 55 wt.% ethylene and about 5wt.% 5-ethylidene-2-norbornene was conducted. The bulk EPDM was dissolved in hexane at a concentration of about 15 wt.% solids. The cement was charged continuously through a calibrated gear pump at a rate of 450 ml/min. to the stirred, staged sulfonation reactor. The sulfonating agent was reformed and added to the sulfonation reactor continuously. The reaction was conducted at 28° C. and 200 KPa.

The sulfonating agent used was acetyl sulfate, formed by metering 188 ml/hr. of acetic anhydride and 36.8 ml/hr. of concentrated sulfuric acid into the reactor. The sulfonation reaction residence time was nine minutes.

The sulfonated cement was then continuously fed into the neutralization vessel and contacted with a zinc acetate solution. The neutralization agent was prepared by dissolving 582.5 grams of zinc acetate.$2H_2O$ in 2535 ml. of methanol and 165 ml. of distilled water. The zinc acetate solution was continuously metered into the neutralization vessel using a calibrated rotometer at a rate of 1320 ml/hr. The reaction was conducted at 28° C. and 100 KPa. The neutralization residence time was three minutes. The product polymer was isolated using steam stripping and dried in a hot air fluid bed dryer.

The final product had an incorporated sulfur content of 0.725 wt.% and a zinc content of 2.03 wt.%.

EXAMPLE 2

This run was carried out using the same process scheme as described in Example 1. The EPDM feedstock (as used in Example 1) was dissolved in hexane to form a cement with a solids content of 18.2 wt.%. The cement was fed to the process at a rate of 150 ml/min.

The sulfonation reaction was conducted at 27° C. and 180 KPa.

The acetyl sulfate sulfonating agent was preformed by metering 387 ml/hr. of acetic anhydride and 76.5 ml/hr. of concentrated sulfuric acid through the "in-line" mixer and into the sulfonation vessel. The sulfonation residence time was 5.8 minutes.

The sulfonated cement was neutralized with a zinc acetate solution. The solution was prepared by dissolving 1,154 grams of zinc acetate.$2H_2O$ in 4,183 ml. of methanol and 272 ml. of water. The zinc acetate was fed to the neutralization vessel at a rate of 1300 ml/hr. The reaction was carried out at 28° C. and 78 KPa. The residence time was two minutes.

In this run, the concentration of methanol in the neutralized cement was reduced to 3.6 vol.%.

The polymer was isolated and finished as in Example 1.

The final product had an incorporated sulfur content of 1.04 wt.% and a zinc content of 1.66 wt.%.

What is claimed is:

1. A continuous process for sulfonating an elastomeric polymer which comprises the steps of:
   (a) forming a cement of said elastomeric polymer by dissolving said elastomeric polymer in a non-reactive solvent selected from the group consisting of chlorinated aliphatic hydrocarbon, a chlorinated aromatic hydrocarbon, an aromatic hydrocarbon and an aliphatic hydrocarbon, said elastomeric polymer being selected from the group consisting of a Butyl rubber, a styrene-butadiene copolymer, an isoprene-styrene copolymer and an EPDM terpolymer;
   (b) continuously contacting a sulfonating agent with said cement for about 2 to about 9 minutes at about −50° C. to +100° C. to form an unneutralized sulfonated elastomeric polymer;
   (c) continuously transferring said cement of said unneutralized sulfonated elastomeric polymer to a staged, neutralization vessel;
   (d) continuously quenching said sulfonation reaction with an aliphatic alcohol, a cycloaliphatic alcohol, water or an aromatic hydroxyl compound in said staged, neutralized vessel; and
   (e) continuously neutralizing in said staged neutralization vessel said unneutralized sulfonated elastomeric polymer with a solution of a metallic salt of a carboxylic acid having about 1 to about 4 carbon atoms to form a neutralized sulfonated elastomeric polymer, wherein a counterion of said metallic salt of said carboxylic acid is selected from the group consisting of aluminum, antimony, lead, and Groups IA, IB, IIA and IIB of the Periodic Table of Elements.

2. A process according to claim 1, further including the step of isolating said neutralized sulfonated elastomeric polymer from said cement in the form of a powder or crumb.

3. A process according to claim 2, further including the steps of drying and finishing said powder or crumb of said neutralized sulfonated elastomeric polymer.

4. An improved process according to claim 1, wherein such sulfonating agent is formed prior to addition to said cement.

5. An improved process according to claim 1, wherein said sulfonating agent is formed, in situ, in said cement.

6. An improved process according to claim 1, wherein such sulfonating agent is formed from a mixture of said $(RCO)_2O$ and concentrated $H_2SO_4$.

7. An improved process according to claim 1, wherein said sulfonating agent is formed from a mixture of said $(RCO)_2O$, $RCO_2H$, and $SO_3$.

8. An improved process according to claim 1, wherein said sulfonating agent is formed from a mixture of $(RCO)_2O$ and $ClSO_3H$.

9. An improved process according to claim 1, wherein such sulfonating agent is formed from a mixture of $RCOCl$ an $H_2SO_4$.

10. An improved process according to claim 1, wherein said sulfonating agent is formed from a mixture of $(RCO)_2O$, $RCO_2M$ and $ClSO_3H$, wherein M is selected from the group consisting essentially of lithium, sodium, potassium, or cesium and mixtures thereof.

11. An improved process according to claim 1 wherein said sulfonating agent is a mixture of $RCOX$, $(RCO)_2O$ and $ClSO_3H$.

12. An improved process according to claim 1, wherein the unneutralized sulfonated elastomeric polymer has about 10 to about 50 meq. $SO_3H$ groups per 100 grams of said sulfonated elastomeric polymer.

13. A process according to claim 1, wherein said sulfonate groups are neutralized with a counterion being selected from the group consisting of ammonium, antimony, aluminum, lead and Groups IA, IIA, IB and IIB of the Periodic Table of Elements and mixtures thereof.

14. A process according to claim 6, wherein said EPDM terpolymer consists essentially of about 40 to about 75 wt.% of ethylene, about 10 to about 53 wt.% of propylene and about 2 to about 10 wt.% of a non-conjugated diene.

15. A process according to claim 1, wherein said neutralizing agent is a metallic salt of a carboxylic acid having about 1 to about 4 carbon atoms.

16. A process according to claim 1, wherein said neutralizing agent is zinc acetate.

* * * * *